US011376792B2

(12) United States Patent
Horn et al.

(10) Patent No.: US 11,376,792 B2
(45) Date of Patent: Jul. 5, 2022

(54) ROBOTIC ADDITIVE MANUFACTURING SYSTEM

(71) Applicant: Carbon, Inc., Redwood City, CA (US)

(72) Inventors: Allan Ovadia Horn, Palo Alto, CA (US); Derek Bruce Young, San Francisco, CA (US); Jens Schmidt, Menlo Park, CA (US); Kenji Kokaji, Redwood City, CA (US); Ryan J. Hollowell, Redwood City, CA (US)

(73) Assignee: Carbon, Inc., Redwood City, CA (US)

( * ) Notice: Subject to any disclaimer, the term of this patent is extended or adjusted under 35 U.S.C. 154(b) by 322 days.

(21) Appl. No.: 16/561,181

(22) Filed: Sep. 5, 2019

(65) Prior Publication Data

US 2020/0070421 A1 Mar. 5, 2020

Related U.S. Application Data

(60) Provisional application No. 62/727,196, filed on Sep. 5, 2018.

(51) Int. Cl.
*B29C 64/379* (2017.01)
*B33Y 30/00* (2015.01)
(Continued)

(52) U.S. Cl.
CPC .......... *B29C 64/379* (2017.08); *B29C 64/245* (2017.08); *B29C 64/35* (2017.08);
(Continued)

(58) Field of Classification Search
CPC ... B29C 64/379; B29C 64/245; B29C 64/393; B29C 64/35; B33Y 30/00; B33Y 40/00; B33Y 50/02
(Continued)

(56) References Cited

U.S. PATENT DOCUMENTS 5,122,441 A 6/1992 Lawton et al.
5,236,637 A 8/1993 Hull
(Continued)

FOREIGN PATENT DOCUMENTS

EP 1077125 A1 2/2001
EP 2727709 A1 5/2014
(Continued)

OTHER PUBLICATIONS

Dendurkuri et al., Continuous-flow lithography for high-throughput microparticle synthesis, Nature Materials, vol. 5, pp. 365-369, May 2006, published online Apr. 9, 2006.
(Continued)

*Primary Examiner* — Joseph S Del Sole
*Assistant Examiner* — Lawrence D. Hohenbrink, Jr.
(74) *Attorney, Agent, or Firm* — Myers Bigel, P.A.

(57) ABSTRACT

An additive manufacturing system includes: (a) a build platform dispensing assembly carrying a plurality of build platforms; (b) at least two additive manufacturing apparatus, each apparatus configured for receiving a removable build platform on which objects can be produced; (c) a build platform buffering assembly configured for removably receiving at least one build platform on which an object has been produced; (d) a cleaning apparatus; and (e) a robot operatively associated with each cleaning apparatus, the at least two additive manufacturing apparatus, the build platform dispensing assembly, and the build platform buffering assembly.

12 Claims, 12 Drawing Sheets

(51) Int. Cl.
  *B33Y 40/00* (2020.01)
  *B29C 64/393* (2017.01)
  *B29C 64/245* (2017.01)
  *B29C 64/35* (2017.01)
  *B33Y 50/02* (2015.01)

(52) U.S. Cl.
  CPC ............ *B29C 64/393* (2017.08); *B33Y 30/00* (2014.12); *B33Y 40/00* (2014.12); *B33Y 50/02* (2014.12)

(58) Field of Classification Search
  USPC ........................................................ 425/162
  See application file for complete search history.

(56) References Cited

U.S. PATENT DOCUMENTS

| | | | |
|---|---|---|---|
| 5,391,072 | A | 2/1995 | Lawton et al. |
| 7,438,846 | B2 | 10/2008 | John |
| 7,709,544 | B2 | 5/2010 | Doyle et al. |
| 7,845,930 | B2 | 12/2010 | Shkolnik et al. |
| 7,892,474 | B2 | 2/2011 | Shkolnik et al. |
| 8,110,135 | B2 | 2/2012 | El-Siblani |
| 8,260,447 | B2 | 9/2012 | Mattes et al. |
| 9,205,601 | B2 | 12/2015 | Desimone et al. |
| 9,211,678 | B2 | 12/2015 | Desimone et al. |
| 9,216,546 | B2 | 12/2015 | Desimone et al. |
| 9,360,757 | B2 | 6/2016 | Desimone et al. |
| 9,453,142 | B2 | 9/2016 | Rolland et al. |
| 9,498,920 | B2 | 11/2016 | Desimone et al. |
| 9,636,873 | B2 | 5/2017 | Joyce |
| 9,993,974 | B2 | 6/2018 | Desimone et al. |
| 10,016,938 | B2 | 7/2018 | Desimone et al. |
| 10,093,064 | B2 | 10/2018 | Desimone et al. |
| 10,144,181 | B2 | 12/2018 | Desimone et al. |
| 10,150,253 | B2 | 12/2018 | Desimone et al. |
| 10,596,755 | B2 | 3/2020 | Desimone et al. |
| 10,618,215 | B2 | 4/2020 | Desimone et al. |
| 10,843,266 | B2 | 11/2020 | Demuth et al. |
| 2006/0022379 | A1 | 2/2006 | Wicker et al. |
| 2009/0037011 | A1 | 2/2009 | Spiridonov et al. |
| 2009/0173443 | A1 | 7/2009 | Kozlak et al. |
| 2011/0089610 | A1 | 4/2011 | El-Siblani et al. |
| 2011/0117268 | A1 | 5/2011 | Batchelder et al. |
| 2012/0183701 | A1 | 7/2012 | Pilz et al. |
| 2013/0075957 | A1* | 3/2013 | Swanson ................ B29C 64/40 264/405 |
| 2013/0295212 | A1 | 11/2013 | Chen et al. |
| 2015/0290878 | A1 | 10/2015 | Houben et al. |
| 2015/0331402 | A1 | 11/2015 | Lin et al. |
| 2015/0360419 | A1 | 12/2015 | Willis et al. |
| 2016/0229123 | A1 | 8/2016 | Carlson et al. |
| 2017/0129167 | A1 | 5/2017 | Castanon |
| 2017/0129169 | A1 | 5/2017 | Batchelder et al. |
| 2018/0133966 | A1* | 5/2018 | Plachner ............... B29C 64/259 |
| 2018/0222115 | A1 | 8/2018 | Watanabe et al. |
| 2018/0236726 | A1 | 8/2018 | Etcheson et al. |
| 2019/0126547 | A1 | 5/2019 | Desimone et al. |
| 2019/0224917 | A1 | 7/2019 | Venkatakrishnan et al. |
| 2019/0389127 | A1 | 12/2019 | Desimone et al. |
| 2020/0139617 | A1 | 5/2020 | Desimone et al. |
| 2021/0187850 | A1 | 6/2021 | Sayers |

FOREIGN PATENT DOCUMENTS

| | | |
|---|---|---|
| WO | 2001/72501 | 10/2001 |
| WO | 2011/086450 | 7/2011 |
| WO | 2015/073322 | 5/2015 |
| WO | 2015112959 A1 | 7/2015 |
| WO | 2016184888 A1 | 11/2016 |
| WO | 2016207777 A1 | 12/2016 |
| WO | 2018169821 A1 | 9/2018 |
| WO | 2018169824 A1 | 9/2018 |
| WO | 2018169826 A1 | 9/2018 |

OTHER PUBLICATIONS

Dendukuri et al., Stop-flow lithography in a microfluidic device, Lab Chip, Jul. 2007, 818-828, published online May 21, 2007.
Dendukuri et al., Modeling of Oxygen-Inhibited Free Radical Photopolymerization in PDMS Microfluidic Device, Macromolecules, 2008, 41 (22), 8547-8556, published Oct. 21, 2008.
Yasuda et al., Permeability of Polymer Membranes to Dissolved Oxygen, pp. 1314-1316 (1966) Journal of Polymer Science, vol. 4.
Stern, S.A., The 'Barrer' Permeability Unit, pp. 1933-1934 (1968) Journal of Polymer Science, Part A-2, vol. 6.
Morelli, Dean. Protest to Canadian Patent Applications by Joseph DeSimone et al. Regarding Continuous Liquid Interphase Printing. Canadian patent applications CA2898098A1, CA 2898103A1, and CA2898106A1. Dec. 31, 2015. Canadian Intellectual Property Office, 37 pp.
Y. Pan et al., J. Manufacturing Sci. and Eng. 134, 051011-1 (Oct. 2012).
J. Tumbleston et al., Continuous liquid interface production of 3d objects, Science 347, 1349-1352 (published online Mar. 16, 2015).
Janusziewicz, Rima, et al., "Layerless fabrication with continuous liquid interface production", PNAS, 113, 2016, 11703-11708.
Stratasys , F900 3D Production System User Guide, 2016, 1-153.

* cited by examiner

ROBOTIC ADDITIVE MANUFACTURING SYSTEM

RELATED APPLICATIONS

This application claims priority from U.S. Provisional Application No. 62/727,196, filed Sep. 5, 2018, the disclosure of which is incorporated by reference herein in its entirety.

FIELD OF THE INVENTION

The present invention concerns additive manufacturing in general, and particularly concerns high throughput systems employing streolithography-type additive manufacturing.

BACKGROUND OF THE INVENTION

A group of additive manufacturing techniques sometimes referred to as "stereolithography" create a three-dimensional object by the sequential polymerization of a light polymerizable resin. Such techniques may be "bottom-up" techniques, where light is projected into the resin onto the bottom of the growing object through a light transmissive window, or "top down" techniques, where light is projected onto the resin on top of the growing object, which is then immersed downward into a pool of resin.

The recent introduction of a more rapid stereolithography technique sometimes referred to as continuous liquid interface production (CLIP) has expanded the usefulness of stereolithography from prototyping to manufacturing. See J. Tumbleston, D. Shirvanyants, N. Ermoshkin et al., *Continuous liquid interface production of 3D objects*, SCIENCE 347, 1349-1352 (published online 16 Mar. 2015); U.S. Pat. Nos. 9,211,678; 9,205,601; and 9,216,546 to DeSimone et al.; see also R. Janusziewicz, et al., *Layerless fabrication with continuous liquid interface production*, PNAS 113, 11703-11708 (18 Oct. 2016).

Dual cure resins for additive manufacturing were introduced shortly after the introduction of CLIP, expanding the usefulness of stereolithography for manufacturing a broad variety of objects still further. See Rolland et al., U.S. Pat. Nos. 9,676,963, 9,453,142 and 9,598,606; J. Poelma and J. Rolland, *Rethinking digital manufacturing with polymers*, SCIENCE 358, 1384-1385 (15 Dec. 2017).

Additive manufacturing systems incorporating robots have been generally suggested, see, e.g., Swanson et al., US Patent Application Pub. No. 2013/0075957 (see for example FIG. 7 therein) and Zhang et al., PCT Patent Application Pub. No. WO 2015/073322, but there remains a need for systems that facilitate the more rapid stereolithography techniques such as CLIP.

SUMMARY OF THE INVENTION

Some embodiments of the present invention are directed to an additive manufacturing system. The system includes: a build platform dispensing assembly carrying a plurality of build platforms; at least two additive manufacturing apparatus, each apparatus configured for receiving a removable build platform on which objects can be produced; a build platform buffering (hotel) assembly configured for removably receiving at least one build platform on which an object has been produced; a cleaning apparatus; and a robot operatively associated with each of the cleaning apparatus, the at least two additive manufacturing apparatus, the build platform dispensing assembly, and the build platform buffering assembly.

In some embodiments, the robot further includes an end effector, the end effector configured to (actively or passively) releasably engage (e.g., lift and move) the build platform.

In some embodiments, the system includes a drip tray. The end effector may be configured to (actively or passively) releasably engage (e.g., lift and move) the drip tray, with the drip tray positioned beneath the build platform when the build platform is also engaged by the end effector.

In some embodiments, the system includes a controller operatively associated with the robot, the cleaning apparatus, the at least two additive manufacturing apparatus, optionally the build platform dispensing assembly, and optionally the build platform buffering assembly.

In some embodiments, the controller is configured to operate the robot to: (i) retrieve a build platform from the dispensing assembly, (ii) insert the build platform into an available one of the at least two additive manufacturing apparatus for additive manufacturing of an object on said build platform, (iii) withdraw a build platform from an additive manufacturing apparatus when production of an object thereon is complete, (iv) either insert a build platform carrying an object into the cleaning apparatus when the cleaning apparatus is available or insert the build platform into the buffering assembly when the cleaning apparatus is not available, (v) withdraw a build platform from the cleaning apparatus when cleaning of the object thereon is complete, (vi) operationally insert a build platform carrying a cleaned object into a build platform receiving assembly that is configured to receive build platforms on which objects have been produced, (vi) withdraw a build platform from the buffering assembly and insert it into the cleaning apparatus when one or more build platforms have been removably inserted in the buffering assembly (e.g., on a first-in-first-out basis), and (vii) repeat steps (i) and (ii) whenever both an additive manufacturing apparatus and a build platform are available.

In some embodiments, the at least two additive manufacturing apparatus and the cleaning apparatus are included in a ratio of at least 2:1, 3:1, or 4:1 (to 10:1 or more).

In some embodiments, the cleaning apparatus comprises a solvent washer (e.g., a batch washer) or a centrifugal separator.

In some embodiments, the system includes: a rinse apparatus; and/or a post-production flood light exposure apparatus.

In some embodiments: the dispensing apparatus is further configured to receive build platforms on which objects have been produced; or the system further includes a receiving apparatus configured to receive build platforms on which objects have been produced, wherein the robot and/or the controller is optionally operatively associated with the receiving apparatus.

In some embodiments, each of the additive manufacturing apparatus further includes a removable window cassette through which patterned light can be projected and above which the objects can be produced. The end effector may be configured to (actively or passively) removably engage (e.g., lift and move) the window cassette.

In some embodiments, each additive manufacturing apparatus includes a stereolithography apparatus (e.g., a top-down stereolithography apparatus, or a bottom-up stereolithography apparatus, such as a continuous liquid interface production apparatus).

In some embodiments, the robot includes an articulated robot, delta robot, cartesian coordinate robot, or SCARA robot.

Some other embodiments of the present invention are directed to a robot end effector for an additive manufacturing system. The end effector includes: a body; a coupling connected to the body and configured to connect the end effector to a robot arm; a first (preferably passive) engagement assembly connected to the body, the first engagement assembly configured to releasably engage a removable build platform for an additive manufacturing apparatus (e.g., a pair of horizontal rests, and optionally a retention post connected to each horizontal rest); and a second (preferably passive) engagement assembly connected to the body, the second engagement assembly configured to releasably engage a drip tray in a position beneath the build platform when the build platform is engaged by the first engagement assembly (e.g., a second pair of horizontal rests, and optionally a retention post connected to each horizontal rest).

In some embodiments, the end effector includes a third (preferably active, such as a pneumatic or electromechanical) engagement assembly connected to the body, the third engagement assembly configured to releasably engage a removable window cassette of a bottom-up stereolithography apparatus (e.g., a pair of opposing jaws).

In some embodiments, the end effector includes: a first sensor connected to the body and positioned for sensing the presence or absence of a build platform on the first engagement assembly (e.g., an electromechanical sensor, an optical sensor, etc.); and a second sensor connected to the body and positioned for sensing the presence or absence of a drip tray on the second engagement assembly (e.g., an electromechanical sensor, an optical sensor, etc.).

Some other embodiments of the present invention are directed to a build platform for a robotic additive manufacturing system. The build platform includes: a body; a build surface portion on the body and configured for producing an object thereon by additive manufacturing (e.g., a substantially flat planar build surface portion, optionally having resin flow channels formed therein); a pallet connected to the body, the pallet optionally having a pair of alignment openings formed therein (e.g., with the pallet having a substantially flat planar bottom surface portion which pallet bottom surface portion is substantially co-planar with or parallel to, but spaced apart from, the build surface portion); and a coupling connected to the body, the coupling configured to removably connect the build platform to an additive manufacturing apparatus (e.g., an elevator assembly of a bottom-up additive manufacturing apparatus).

In some embodiments, the build platform includes a sensor triggering element operatively associated with the body (e.g., directly connected to the body; connected to the pallet or pallet front bumper, etc.), which sensor triggering element is configured for triggering a sensor of a robotic arm end effector.

In some embodiments, the build platform includes: a front bumper connected to the pallet; and/or (g) a rear bumper connected to the pallet.

Some other embodiments of the present invention are directed to a drip tray for a robotic additive manufacturing apparatus. The drip tray includes: a frame having opposite side portions; a pan connected to the frame and positioned between the opposite side portions; a pair of skids, each skid connected to one of the frame opposite side portions, with the skids positioned above the pan, and spaced apart from one another (e.g., so that a build platform and/or objects produced on the build platform can extend between the skids when the drip tray and a build platform are mounted together on a robotic end effector), each skid optionally having an alignment opening formed therein.

In some embodiments, the drip tray includes a sensor triggering element operatively associated with the frame (e.g., directly connected to the frame; connected to the pan, etc.), which sensor triggering element is configured for triggering a drip tray sensor of a robotic arm end effector.

The foregoing and other objects and aspects of the present invention are explained in greater detail in the drawings herein and the specification set forth below. The disclosures of all United States patent references cited herein are to be incorporated herein by reference.

DETAILED DESCRIPTION OF ILLUSTRATIVE EMBODIMENTS

Figure 1:
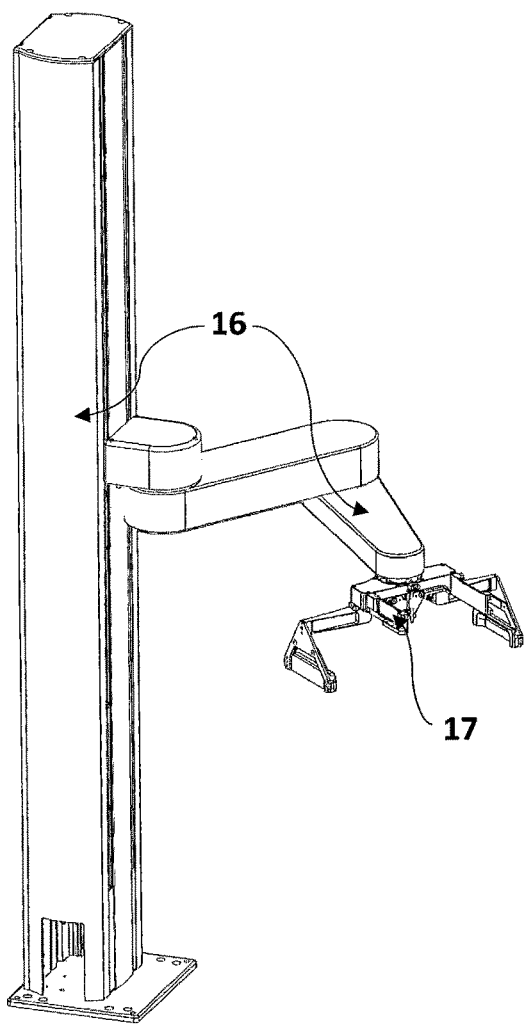
FIG. 1 is a perspective view of a robotic arm with end effector, according to one non-limiting embodiment of the present invention
Figure 2:
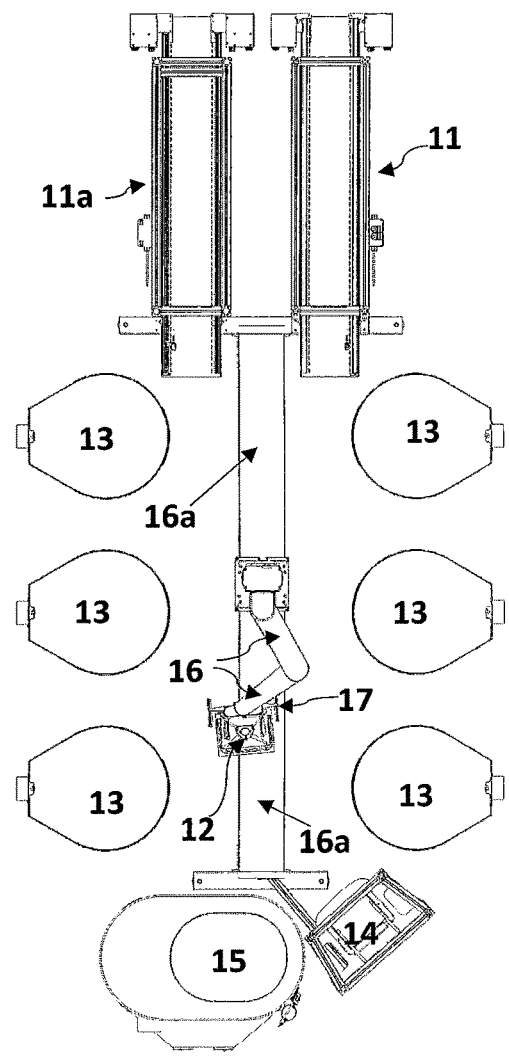
FIG. 2 is a plan view of a system, according to one non-limiting embodiment of the present invention.

The present invention is now described more fully hereinafter with reference to the accompanying drawings, in which embodiments of the invention are shown. This invention may, however, be embodied in many different forms and should not be construed as limited to the embodiments set forth herein; rather these embodiments are provided so that this disclosure will be thorough and complete and will fully convey the scope of the invention to those skilled in the art.

Like numbers refer to like elements throughout. In the figures, the thickness of certain lines, layers, components, elements or features may be exaggerated for clarity. Where used, broken lines illustrate optional features or operations unless specified otherwise.

The terminology used herein is for the purpose of describing particular embodiments only and is not intended to be limiting of the invention. As used herein, the singular forms "a," "an" and "the" are intended to include plural forms as well, unless the context clearly indicates otherwise. It will be further understood that the terms "comprises" or "comprising," when used in this specification, specify the presence of stated features, integers, steps, operations, elements components and/or groups or combinations thereof, but do not preclude the presence or addition of one or more other features, integers, steps, operations, elements, components and/or groups or combinations thereof.

As used herein, the term "and/or" includes any and all possible combinations or one or more of the associated listed items, as well as the lack of combinations when interpreted in the alternative ("or").

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and claims and should not be interpreted in an idealized or overly formal sense unless expressly so defined herein. Well-known functions or constructions may not be described in detail for brevity and/or clarity.

It will be understood that when an element is referred to as being "on," "attached" to, "connected" to, "coupled" with, "contacting," etc., another element, it can be directly on, attached to, connected to, coupled with and/or contacting the other element or intervening elements can also be present. In contrast, when an element is referred to as being, for example, "directly on," "directly attached" to, "directly connected" to, "directly coupled" with or "directly contacting" another element, there are no intervening elements present. It will also be appreciated by those of skill in the art that references to a structure or feature that is disposed "adjacent" another feature can have portions that overlap or underlie the adjacent feature.

Spatially relative terms, such as "under," "below," "lower," "over," "upper" and the like, may be used herein for ease of description to describe an element's or feature's relationship to another element(s) or feature(s) as illustrated in the figures. It will be understood that the spatially relative terms are intended to encompass different orientations of the device in use or operation in addition to the orientation depicted in the figures. For example, if the device in the figures is inverted, elements described as "under" or "beneath" other elements or features would then be oriented "over" the other elements or features. Thus the exemplary term "under" can encompass both an orientation of over and under. The device may otherwise be oriented (rotated 90 degrees or at other orientations) and the spatially relative descriptors used herein interpreted accordingly. Similarly, the terms "upwardly," "downwardly," "vertical," "horizontal" and the like are used herein for the purpose of explanation only, unless specifically indicated otherwise.

It will be understood that, although the terms first, second, etc., may be used herein to describe various elements, components, regions, layers and/or sections, these elements, components, regions, layers and/or sections should not be limited by these terms. Rather, these terms are only used to distinguish one element, component, region, layer and/or section, from another element, component, region, layer and/or section. Thus, a first element, component, region, layer or section discussed herein could be termed a second element, component, region, layer or section without departing from the teachings of the present invention. The sequence of operations (or steps) is not limited to the order presented in the claims or figures unless specifically indicated otherwise.

1. Additive Manufacturing Apparatus.

Conventional (or "single cure") resins, or dual cure resins, can be used in carrying out various aspects of the present invention. Examples include but are not limited to those described in DeSimone et al., U.S. Pat. No. 9,211,678; in Rolland et al., U.S. Pat. Nos. 9,676,963; 9,598,606; and 9,453,142, and in Wu et al., US Patent Application Pub. No. US2017/0260418, the disclosures of which are incorporated herein by reference. Example dual cure resins include, but are not limited to, Carbon Inc. EPU 40, EPU 41, FPU, RPU 70, SIL 30, and EPX 82 resins, all available from Carbon Inc. 1089 Mills Way, Redwood City, Calif. 94063 USA.

Apparatus and methods for carrying out additive manufacturing are known. Suitable techniques include bottom-up or top-down additive manufacturing, generally known as stereolithography. Such methods are known and described in, for example, U.S. Pat. No. 5,236,637 to Hull, U.S. Pat. Nos. 5,391,072 and 5,529,473 to Lawton, U.S. Pat. No. 7,438,846 to John, U.S. Pat. No. 7,892,474 to Shkolnik, U.S. Pat. No. 8,110,135 to El-Siblani, U.S. Patent Application Publication No. 2013/0292862 to Joyce, and US Patent Application Publication No. 2013/0295212 to Chen et al. The disclosures of these patents and applications are incorporated by reference herein in their entirety.

In some embodiments, the intermediate object is formed by continuous liquid interface production (CLIP). CLIP is known and described in, for example, U.S. Pat. Nos. 9,211,678, 9,205,601, 9,216,546, and in J. Tumbleston, D. Shirvanyants, N. Ermoshkin et al., Continuous liquid interface production of 3D Objects, *Science* 347, 1349-1352 (published online 16 Mar. 2015). See also R. Janusziewcz et al., Layerless fabrication with continuous liquid interface production, *Proc. Natl. Acad. Sci. USA* 113, 11703-11708 (Oct. 18, 2016). In some embodiments, CLIP employs features of a bottom-up three-dimensional fabrication as described above, but the irradiating and/or said advancing steps are carried out while also concurrently maintaining a stable or persistent liquid interface between the growing object and the build surface or window, such as by: (i) continuously maintaining a dead zone of polymerizable liquid in contact with said build surface, and (ii) continuously maintaining a gradient of polymerization zone (such as an active surface) between the dead zone and the solid polymer and in contact with each thereof, the gradient of polymerization zone comprising the first component in partially cured form. In some embodiments of CLIP, the optically transparent member comprises a semipermeable member (e.g., a fluoropolymer), and the continuously maintaining a dead zone is carried out by feeding an inhibitor of polymerization through the optically transparent member, thereby creating a gradient of inhibitor in the dead zone and optionally in at least a portion of the gradient of polymerization zone. Other approaches for carrying out CLIP that can be used in the present invention and potentially obviate the need for a semipermeable "window" or window structure include utilizing a liquid interface comprising an immiscible liquid (see L. Robeson et al., WO 2015/164234, published Oct. 29, 2015), generating oxygen as an inhibitor by electrolysis (see I Craven et al., WO 2016/133759, published Aug. 25, 2016), and incorporating magnetically positionable particles to which the photoactivator is coupled into the polymerizable liquid (see J. Rolland, WO 2016/145182, published Sep. 15, 2016).

In preferred embodiments, the additive manufacturing apparatus is a bottom-up stereolithography apparatus (including but not limited to apparatus carrying out CLIP), employing a removable window cassette, such as described in B. Feller et al., *Three-dimensional printing with build plates having reduced pressure and/or channels for increased fluid flow*, PCT Patent Application Pub. No. WO 2018/006029, or B. Feller et al., *Three-dimensional printing method and apparatus for reducing bubbles by de-gassing through build plate*, PCT Patent Application Pub. No. WO 2018/006018 (where "build plate" refers to the "window cassette"). Particularly preferred additive manufacturing apparatus are the M1 and M2 printers available from Carbon Inc., 1089 Mills Way, Redwood City, Calif. 94063 USA.

2. Cleaning Apparatus.

Any suitable cleaning apparatus can be used to carry out the present invention. The cleaning apparatus is preferably a "batch" cleaning apparatus (due in part to their reasonably compact size and their ability to serve more than one additive manufacturing apparatus) as opposed to a "continuous" cleaning apparatus (which may require a relatively large housing or elongate path or tunnel). Examples include blowers (to blow residual resin off of the objects), centrifugal spinners (which can be employed to centrifugally separate resin from the object), washers (which wash the resin off of object with a wash liquid, optionally by agitating the objects and/or wash liquid), etc., including combinations thereof. Examples are given in C. Converse et al., PCT Patent Application Publication No. WO 2018/111548 (published 21 Jun. 2018); W. Farnworth, US Patent Application Publication No. US 2007/179655, and variations thereof that will be apparent to those skilled in the art. A particularly preferred cleaning apparatus is "Smart Part Washer" available from Carbon Inc., 1089 Mills Way, Redwood City, Calif. 94063 USA.

3. System and Additional System Components

A non-limiting example of an additive manufacturing system of the present invention is given in FIGS. 1-4. The example system includes: a build platform dispensing assembly (11), optionally but preferably carrying a plurality of build platforms (e.g., 12 in FIG. 7); at least two additive manufacturing apparatus (13), each apparatus configured for receiving a removable build platform on which objects can be produced; a build platform buffering assembly (or "hotel") assembly (14) configured for removably receiving at least one build platform on which an object has been produced; a cleaning apparatus (15); optionally a build platform receiving assembly configured to receive build platforms on which objects have been produced; and a robot (16) operatively associated with each of said cleaning apparatus, said at least two additive manufacturing apparatus, said build platform dispensing assembly, optionally said build platform receiving assembly, and said build platform buffering assembly.

An end effector (17) is operatively associated with the robot, the end effector configured to (actively or passively, preferably passively) releasably engage (e.g., lift and move) the build platform(s) (e.g., from dispenser to an additive manufacturing apparatus; from additive manufacturing apparatus to cleaner or hotel; from hotel to cleaner; from cleaner to receiving apparatus, etc.).

In some embodiments, the system further includes a drip tray (e.g., 18 in FIG. 8), and the end effector is further configured to (actively or passively, preferably passively) releasably engage (e.g., lift and move) said drip tray, with said drip tray positioned beneath said build platform when said build platform is also engaged by said end effector.

Figure 3:
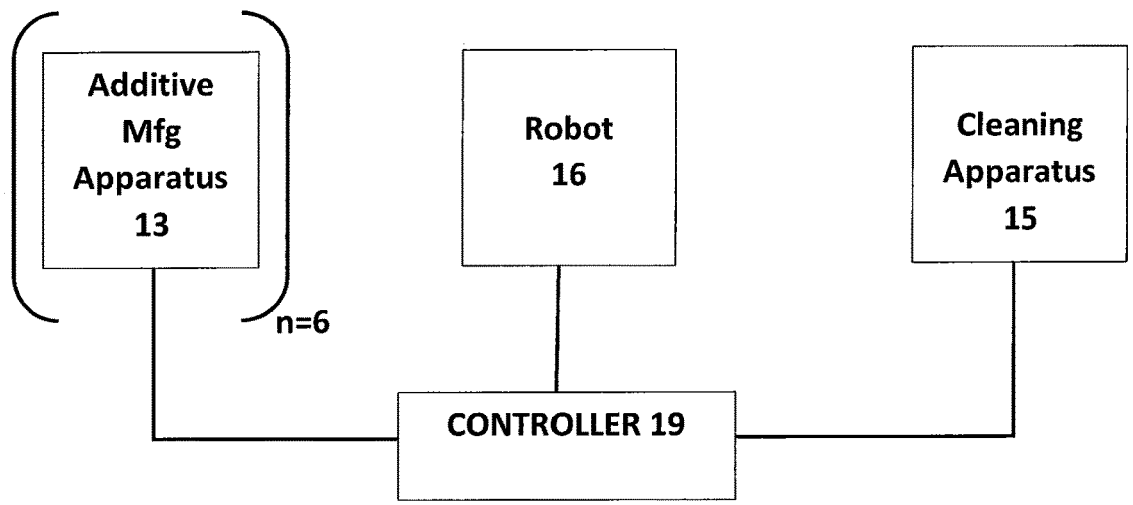
FIG. 3 is a schematic diagram of a system of the invention, showing a controller.
Figure 4:
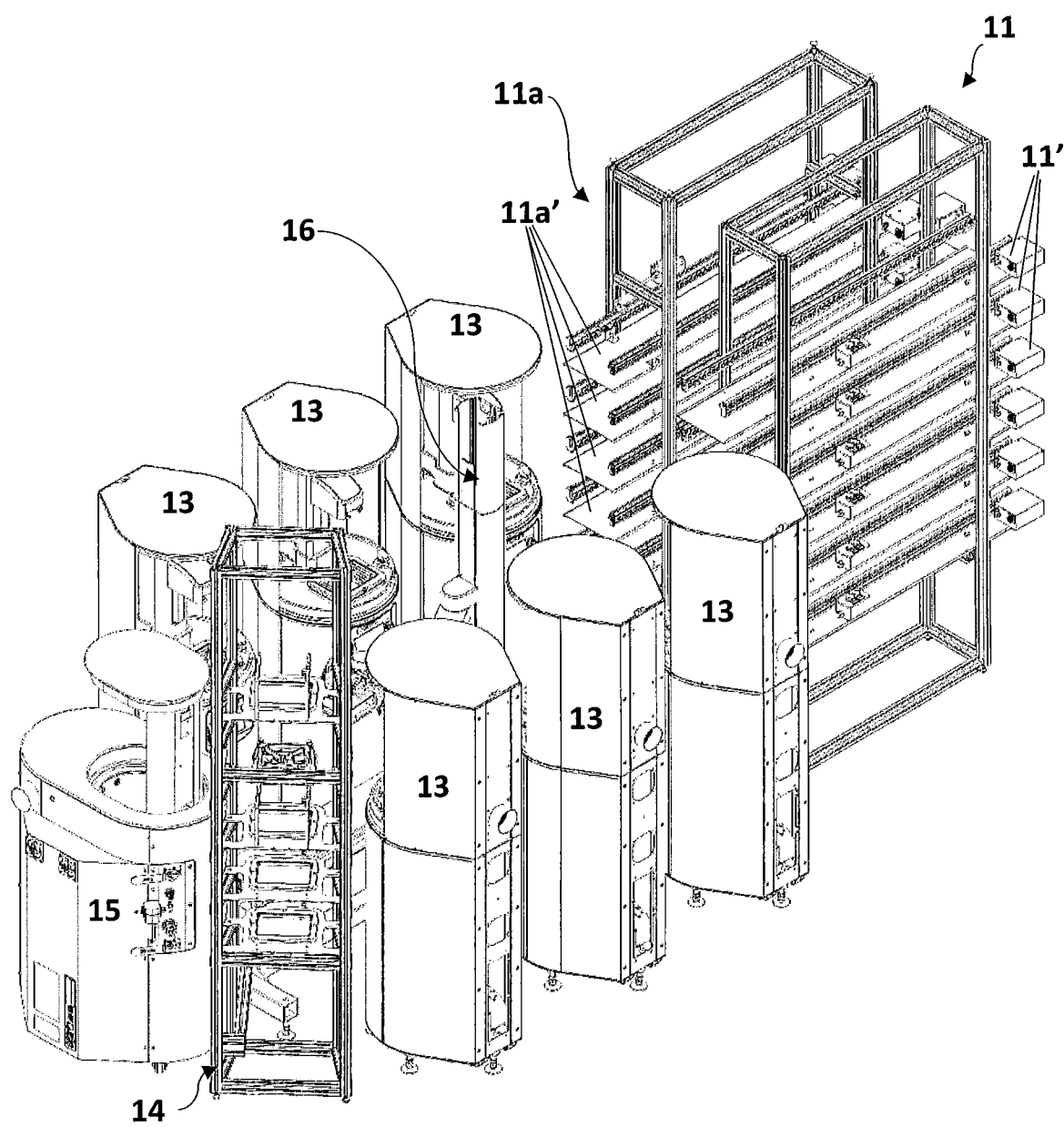
FIG. 4 is a perspective view of the system of FIG. 3.

In the illustrated embodiment, three are six additive manufacturing apparatus included for a single cleaner (n=6 in FIG. 3). In general, however, the additive manufacturing apparatus and the cleaning apparatus are included in the system in a ratio of at least 2:1, 3:1, or 4:1 (to 10:1 or more).

The buffer (14) may comprise simply a frame with one, or a plurality, of shelves or stations on which build platforms can be removably placed by the robot. The stations may optionally include sensors (opto-electronic or electromechanical) to detect the presence of an item thereon, the sensor operatively associated with the controller. Or, where a count of build platforms is known or pre-entered on the controller, or counting is accomplished elsewhere in the flow of the system, the need for such sensors may be obviated. Note also, that, while the frame preferably includes a plurality of individual stations (e.g., at least 2, 4, or 6) if all stations are full, the controller may be configured to simply leave build platforms carrying finished objects in the additive manufacturing machines until a buffer station becomes available.

Other stations can optionally be included in the system, such as a rinse apparatus (e.g., to reduce the amount of residual wash liquid remaining on a part with a more innocuous liquid), a post-production flood light exposure apparatus (to further light polymerize the object), etc.

As a physical or operative conclusion of the system, in some embodiments, the dispensing apparatus may be configured to itself receive build platforms on which objects have been produced (e.g., into empty conveyor lines from which all build platforms have been previously dispensed). Or, the system may comprise a separate receiving apparatus or assembly (11*a*) configured to receive build platforms on which objects have been produced. In the illustrated embodiment, the dispensing apparatus and receiving apparatus (11, 11*a*) (which together may be referred to herein as a build platform dispensing and receiving assembly) comprise separate sets of similar conveyors (11', 11*a*') but note that the controller can be configured (optionally with sensors operatively associated with each conveyor) so that an empty dispensing conveyor can be automatically converted to a receiving conveyor. While the illustrated embodiment employs conveyors, note that other dispensing and/or receiving apparatus, including simply shelves, may also be employed. Currently preferred is a set of QUICKDRAW™ conveyors, available from Quickdraw Conveyor Systems, 9650 Newton Ave S. Bloomington, Minn. 55431 USA.

In still other embodiments, the receiving apparatus or assembly may comprise an oven (e.g., a batch oven with multiple shelves). In some embodiments the oven can be manually operated, while in other embodiments the oven can be configured, or operatively associated with the controller, so that, when the oven is filled with multiple objects, a bake cycle is initiated for all of the objects in the oven as a single batch, which can then be removed when the bake cycle for that batch of objects is completed. If the build platforms are not heat tolerant, then a separate separation station such as a scraper can be included as part of the receiving apparatus, optionally with an additional robot to collect and transfer objects into the oven.

The system typically includes or accommodates a controller (19) operatively associated with the robot, the cleaning apparatus, and the at least two additive manufacturing apparatus. The controller can optionally be associated with the build platform dispensing and receiving assembly, and optionally the build platform buffering assembly, for example to include counters or the like to count the number of build plates dispensed, or in use at any one time, though the number of build platforms could also simply be entered manually. Operation of preferred embodiments of the controller are discussed further below.

Robot.

Examples of robots that may be used to carry out the invention include, but are not limited to, articulated robots, delta robots, cartesian coordinate robots, and selective compliance assembly robot arm (or "SCARA") robots (e.g., 16). Robots may include a linear rail or track (FIG. 2, 16a) on which the robot travels, to provide extended travel and reach. A currently preferred robot is the Precise Automation PF3400 SCARA robot including linear rail, available from Precise Automation, 47350 Fremont Boulevard, Fremont, Calif. 94538 USA.

End Effector.

Figure 5:
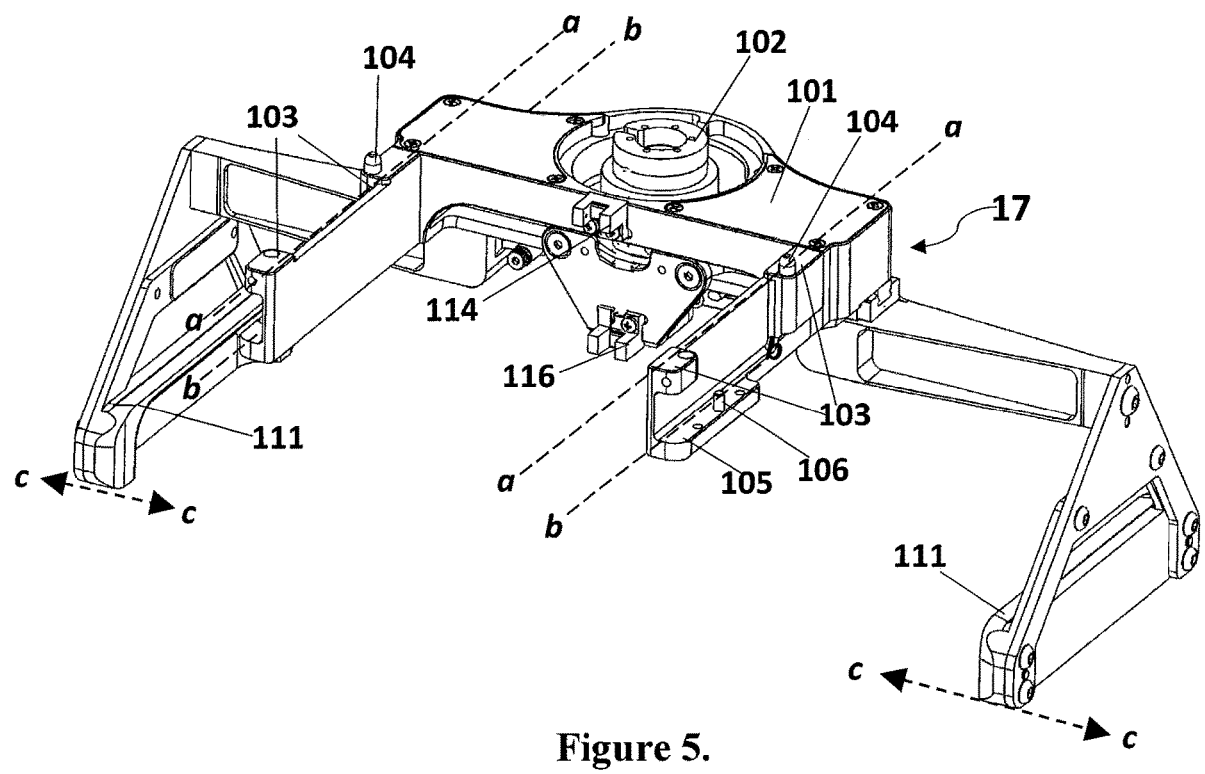
FIG. 5 is a perspective view of the end effector in the system of FIGS. 2-4.
Figure 6:
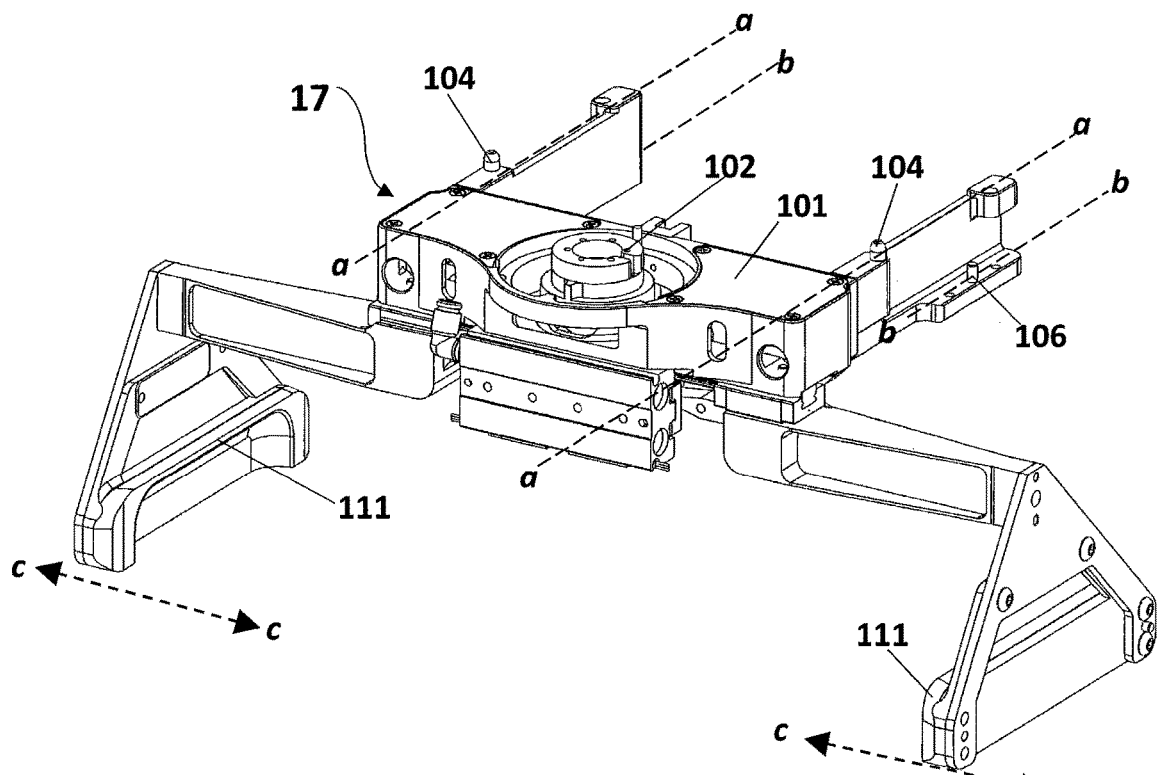
FIG. 6 is a perspective view of the end effector of FIG. 5, taken from the opposite side.

A non-limiting example of an end effector for coupling to a robot as described above is given in FIGS. 5-6, with additional details of the operation thereof given in FIGS. 9-14 and 16. In a non-limiting example, a robot end effector (17) for an additive manufacturing system, includes: a body (101); a coupling (102) connected to said body and configured to connect said end effector to the robot arm; a first (preferably passive) engagement assembly connected to the body, the first engagement assembly configured to releasably engage a removable build platform for an additive manufacturing apparatus (e.g., a pair of horizontal rests (103), and optionally a retention post (104) connected to each said horizontal rest, so that the build platform can be suspended along planes a-a); and a second (preferably passive) engagement assembly connected to the body, with the second engagement assembly configured to releasably engage a drip tray in a position beneath the build platform when the build platform is engaged by said first engagement assembly (e.g., a second pair of horizontal rests (105), and optionally a retention post (106) connected to each said horizontal rest, so that a drip tray can be suspended along planes b-b). Particular operations are further illustrated and discussed below Optionally, but in some embodiments preferably, the end effector further includes a third (preferably active, such as a pneumatic or electromechanical) engagement assembly connected to the body, said third engagement assembly configured to releasably engage a removable window cassette of a bottom-up stereolithography apparatus (e.g., a pair of opposing jaws (111) configured to clamp a window cassette by opening and closing along planes c-c of FIGS. 5-6). Again, this operation is further illustrated and discussed below. In a preferred embodiment, this active engagement assembly may comprise an SMC MHF2-8D2 Gripper, available from SMC Corporation and its distributors (many locations).

In some embodiments, the end effector may further include a first sensor connected to the body and positioned for sensing the presence or absence of a build platform on said first engagement assembly (e.g., an electromechanical sensor, an optical sensor (114), etc.), and/or a second sensor connected to the body and positioned for sensing the presence or absence of a drip tray on said second engagement assembly (e.g., an electromechanical sensor, an optical sensor (116), etc.). The sensors may be connected to the controller to provide positive feedback on the engagement of a build platform and/or a drip tray thereto.

Build Platform.

Figure 7:
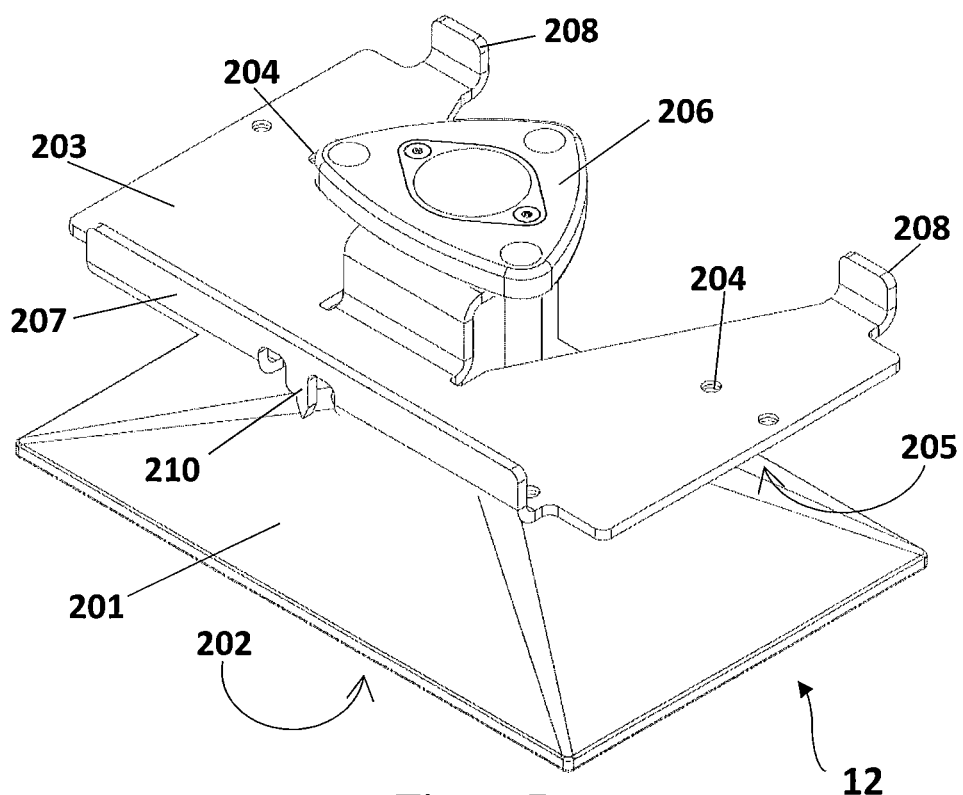
FIG. 7 is a perspective view of a build platform of the system of FIGS. 2-4.

A non-limiting example of a build platform for carrying out the present invention is shown in FIG. 7. The example build platform (12) includes a body (201); a build surface portion (202) on said body and configured for producing an object thereon by additive manufacturing (e.g., a substantially flat planar build surface portion, optionally having resin flow channels formed therein); a pallet (203) connected to the body, the pallet optionally having a pair of alignment openings (204) formed therein (e.g., with the pallet having a substantially flat planar bottom surface portion (205) which pallet bottom surface portion is substantially coplanar with or parallel to, but spaced apart from (and positioned above), the build surface portion); and a coupling (206) connected to the body, the coupling configured to removably connect the build platform to an additive manufacturing apparatus (e.g., an elevator assembly of a bottom-up additive manufacturing apparatus, such as a Carbon Inc. M1 or M2 apparatus).

In some embodiments, the build platform further includes a sensor triggering element operatively associated with said body (e.g., directly connected to the body; connected to the pallet or pallet front bumper, etc.) which sensor triggering element is configured (e.g., as a protruding finger 210) for triggering a sensor of a robotic arm end effector (e.g., sensor 114).

Optionally, but in some embodiments preferably, the platform includes a front bumper (207) connected to the pallet and/or a rear bumper (208) connected to the pallet, to facilitate the dispensing and/or receiving of the build platforms by the engagement of their respective pallets on a conveyor.

Figure 11:
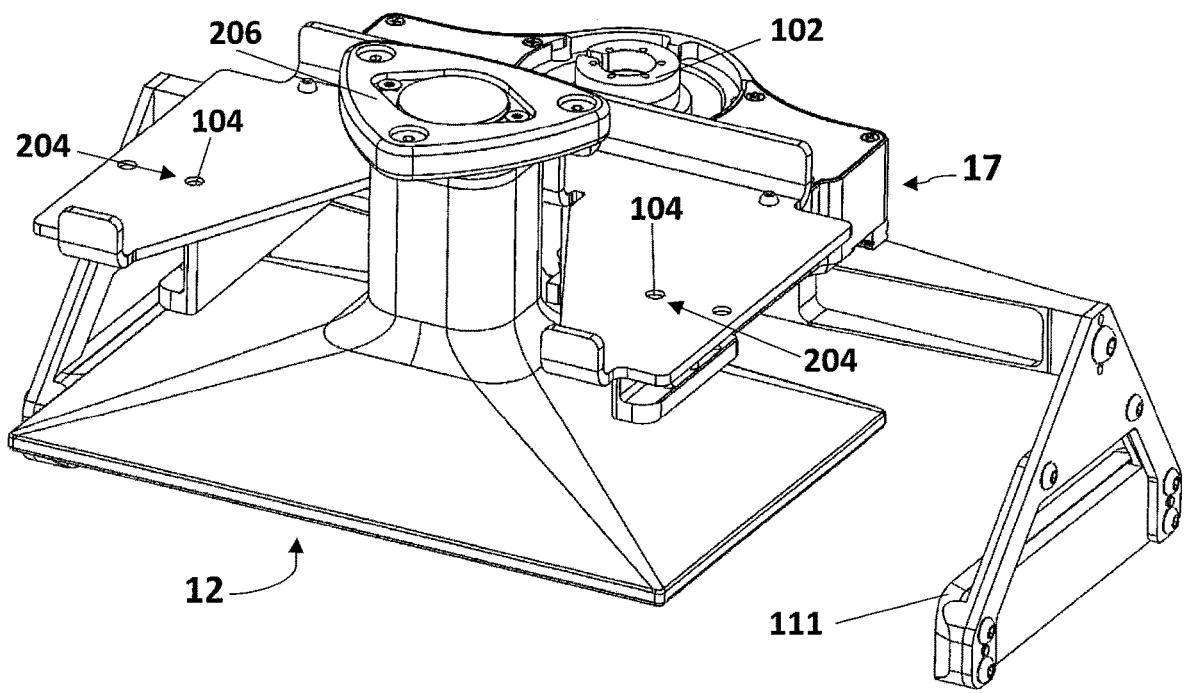
FIG. 11 is a perspective view of an end effector of FIGS. 5-6, carrying a build platform of FIG. 7.
Figure 12:
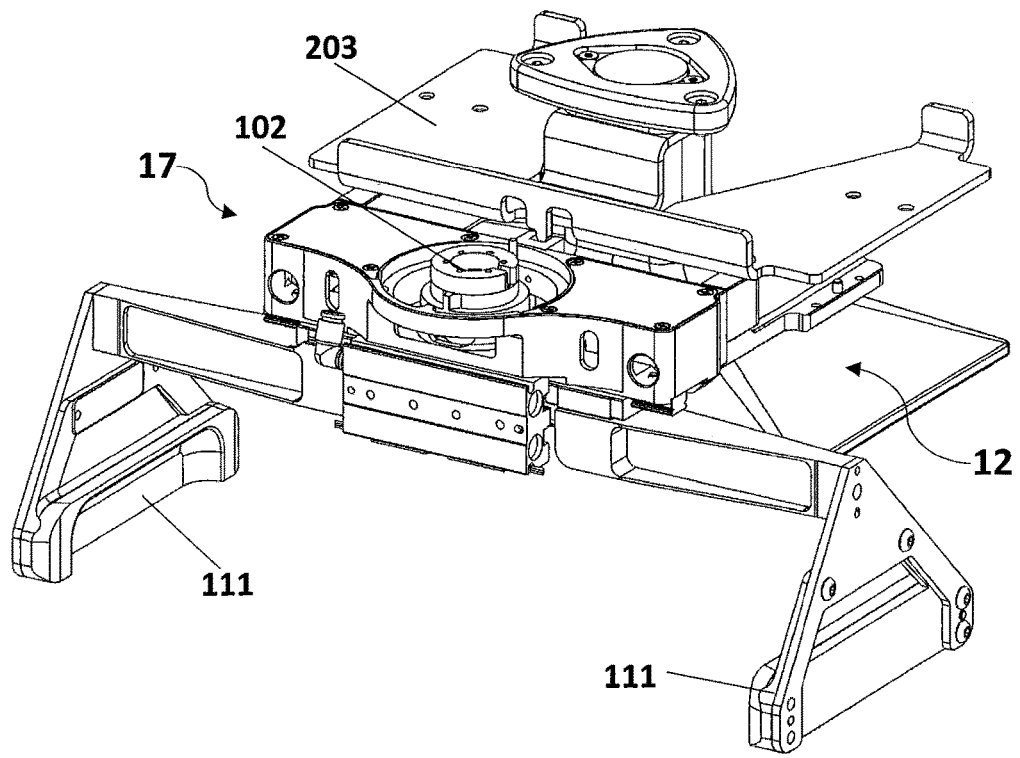
FIG. 12 is a perspective view of the end effector carrying a build platform, both of FIG. 11, taken from the opposite side.

FIGS. 11-12 show a build platform 12 being passively engaged by an end effector as described above, along planes a-a of FIGS. 5-6. When the system is in operation, a drip tray is preferably also engaged by the end effector whenever a build platform having objects formed thereon is also engaged by the end effector, as discussed further below.

Drip Tray.

Figure 8:
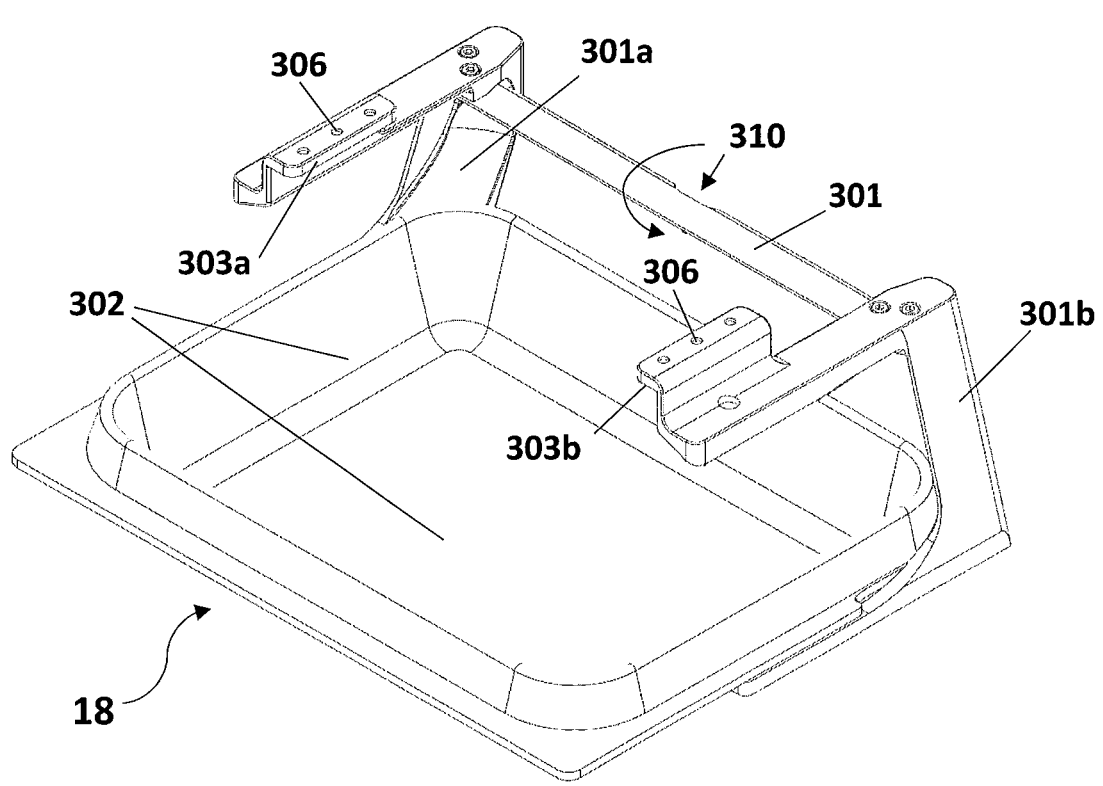
FIG. 8 is a perspective view of a drip tray of the system of FIGS. 2-4.

A non-limiting example of a drip tray for carrying out the present invention is shown in FIG. 8. The example drip tray (18) includes a frame (301) having opposite side portions (301a, 301b), a pan (302) connected to the frame and positioned between the opposite side portions, and a pair of skids (303a, 303b), each skid connected to one of the frame opposite side portions. The skids are positioned above the pan, and spaced apart from one another (e.g., so that a build platform and/or objects produced on said build platform can extend between the skids when the drip tray and a build platform are mounted together on a robotic end effector). Each skid can optionally have an alignment opening (306) formed therein.

In some embodiments, the drip tray further includes a sensor triggering element (310) operatively associated with said frame (e.g., directly connected to the body; connected to the pan, etc.). The sensor triggering element is configured (for example, as a protruding finger) to trigger a drip tray sensor of a robotic arm end effector (e.g., sensor 116).

Figure 9:
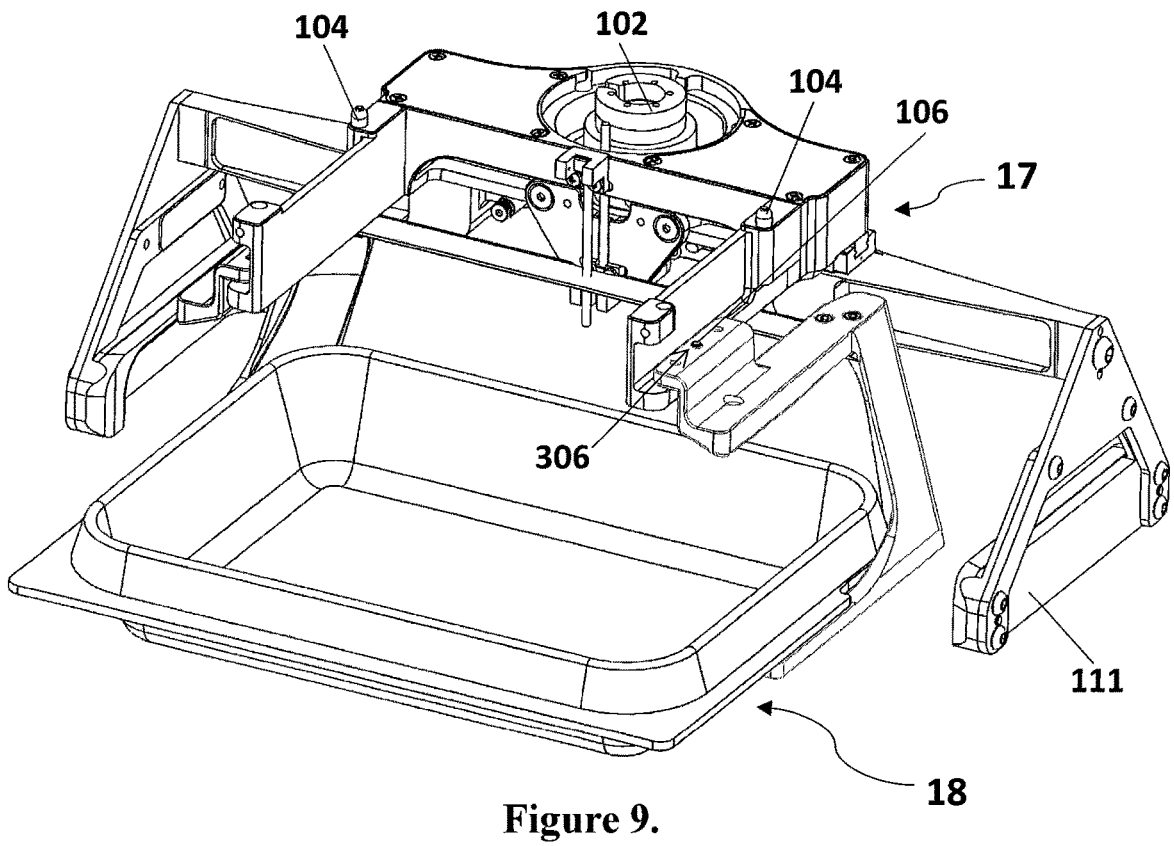
FIG. 9 is a perspective view of an end effector of FIGS. 5-6 carrying a drip tray of FIG. 8.
Figure 10:
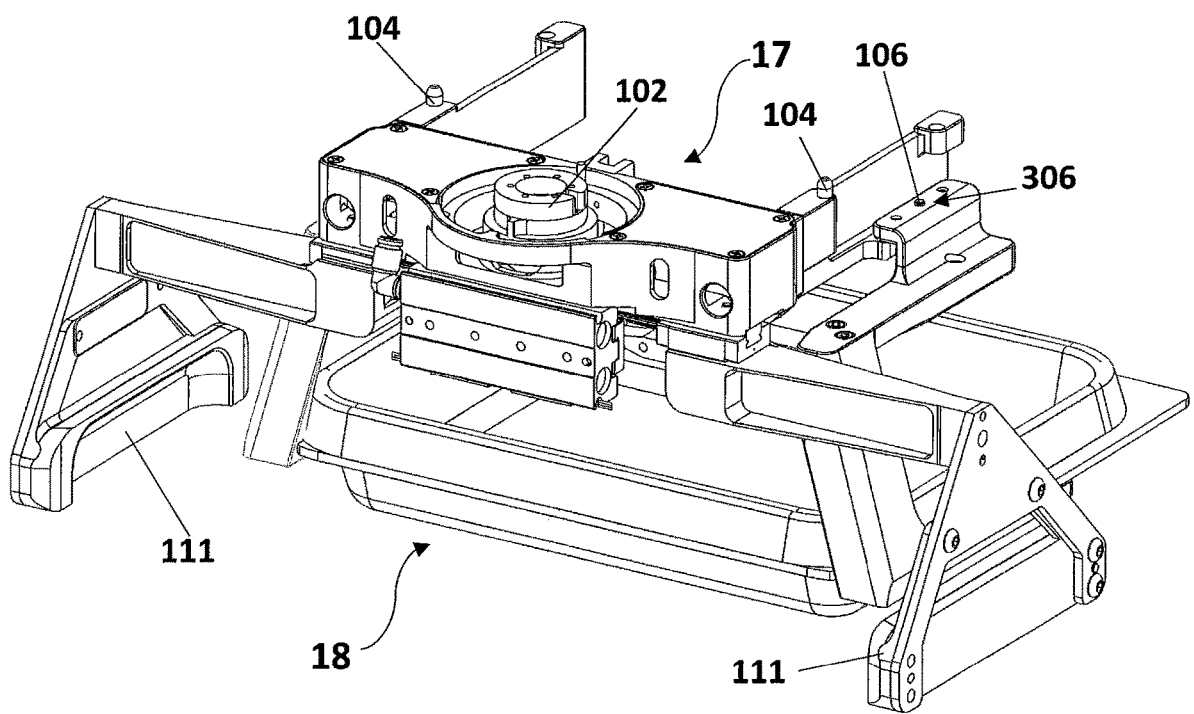
FIG. 10 is a perspective view of the end effector carrying a drip tray of FIG. 9, taken from the opposite side.
Figure 13:
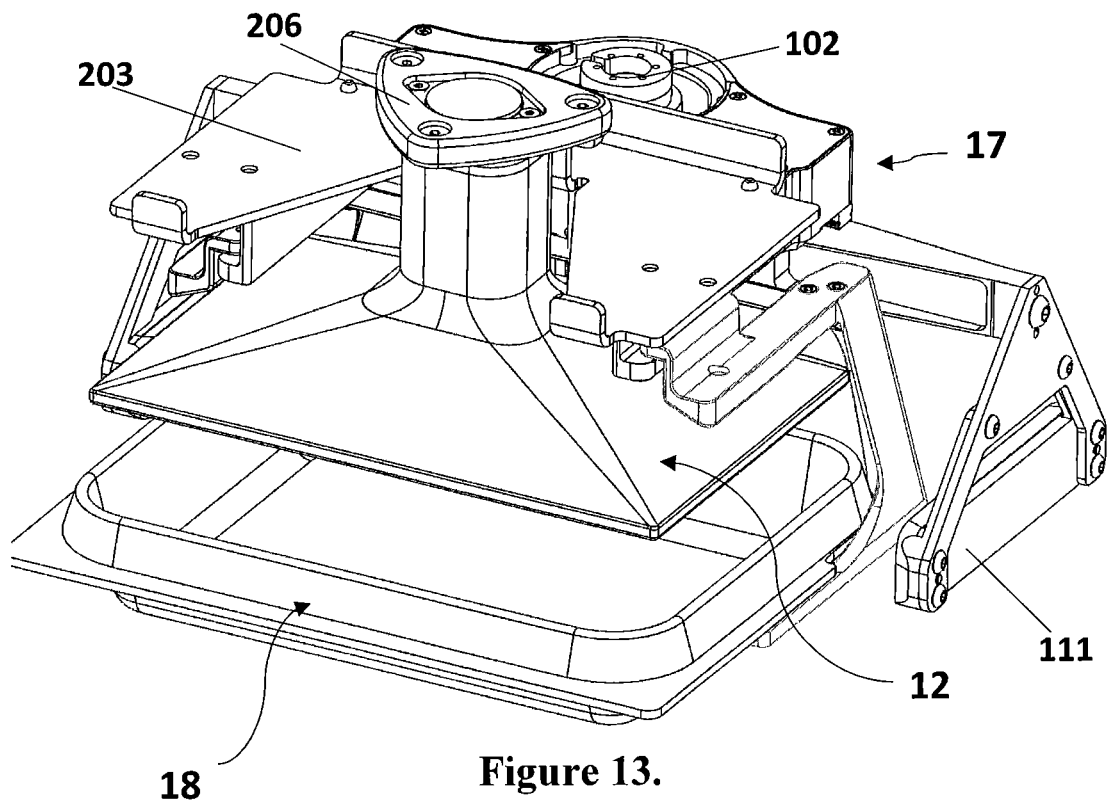
FIG. 13 is a perspective view of an end effector of FIGS. 5-6, carrying both a drip tray of FIG. 8 and a build platform of FIG. 7.
Figure 14:
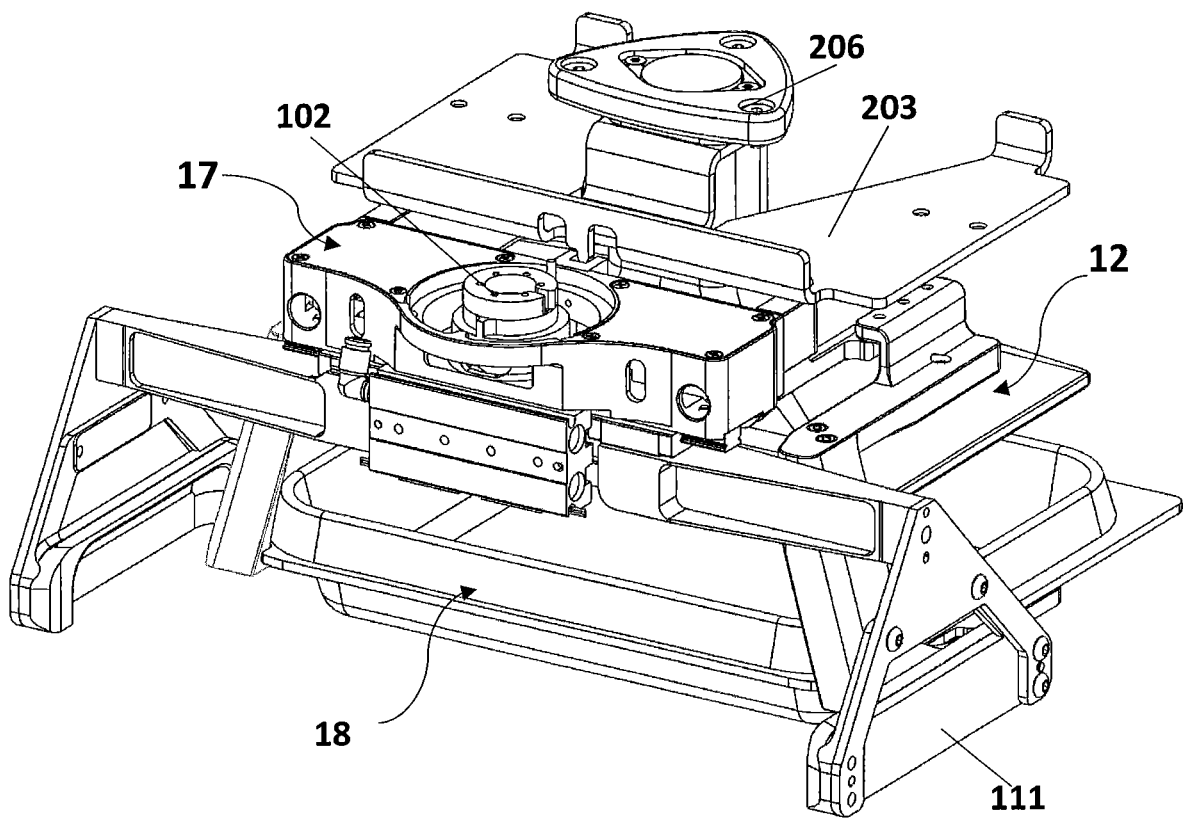
FIG. 14 is a perspective view of an end effector carrying both a drip tray and a build platform, both of FIG. 13, taken from the opposite side.

FIGS. 9-10 show a drip tray 18 being passively engaged by an end effector as described above, along planes b-b of FIGS. 5-6. As noted above, when the system is in operation, a drip tray is preferably engaged by the end effector whenever a build platform having objects formed thereon is also engaged by the end effector, so that excess resin on the surface of the object does not fall on the floor, or on other system components, as shown in FIGS. 13-14.

Failure Detection.

If the system is intended to operate for extended periods of time without human monitoring, then an automated failure detection feature can be included in each additive manufacturing apparatus, by which a failed production of an object can be detected. (e.g., an object falling off the build platform onto the build surface, or into the window cassette, a distorted or defectively shaped object produced on the build platform, etc.).

Any failure detection system can be employed. The mass of the build platform, after production or after cleaning, can be detected (e.g., on a weigh station), with a mass less than expected (in light of the parts produced thereon) indicating a part has fallen off, or has been incompletely produced. Force sensing during additive production, or at the beginning of production (to detect collision of the build platform with a part that has fallen onto the window surface) can be used. Machine vision inspection of the objects during production, immediately after production, and/or after cleaning, can be included, in accordance with known techniques (see, for example, Cognex, *Introduction to Machine Vision: A guide to automating process & quality improvements* (2016)).

If additive production failure is detected, then in some embodiments the window cassette from which the failed production arose can be removed and quarantined, and optionally replaced with a fresh window cassette, by the robot.

Figure 15:
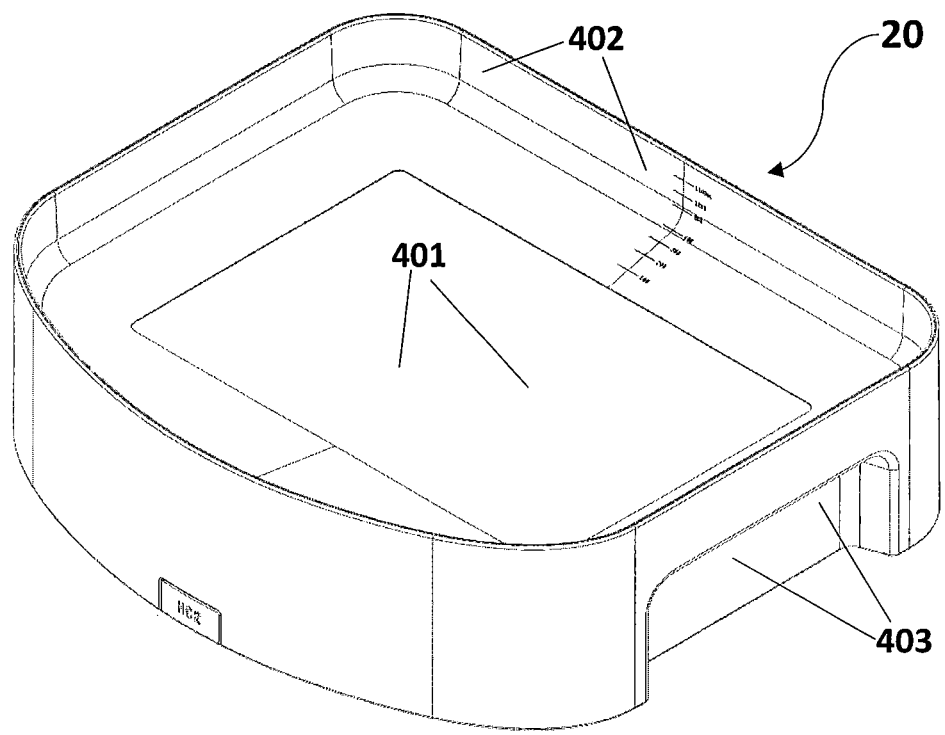
FIG. 15 is a perspective view of a window cassette of the system of FIGS. 2-4.
Figure 16:
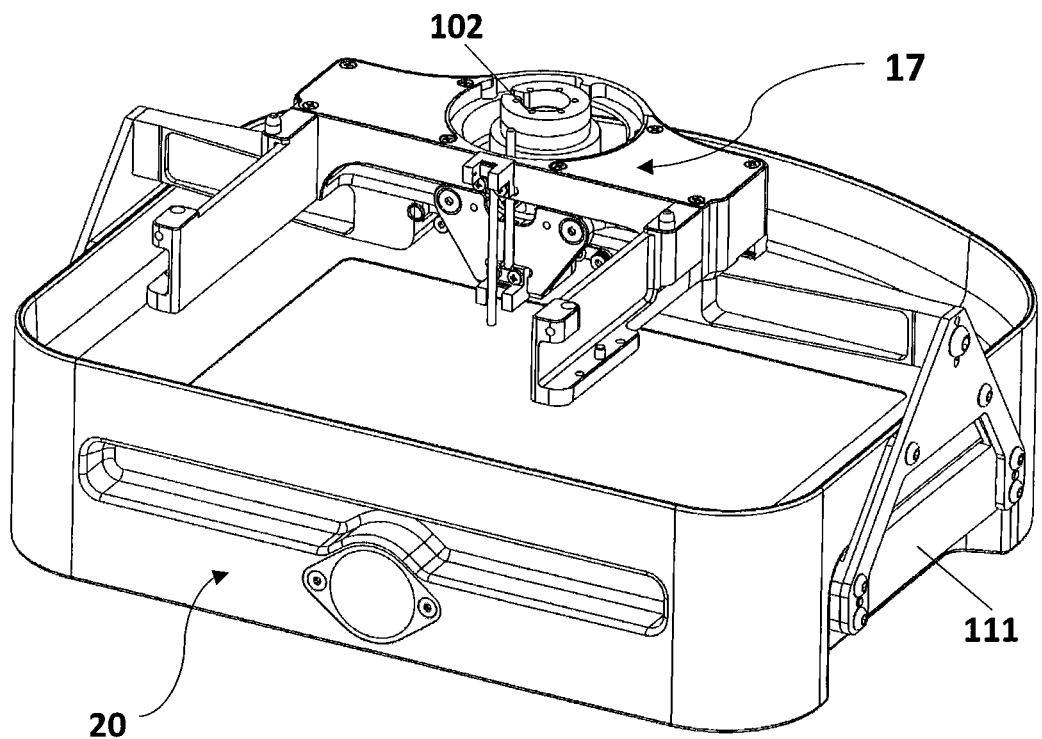
FIG. 16 is a perspective view of an end effector of FIGS. 5-6 carrying a window cassette of FIG. 15.
Figure 17:
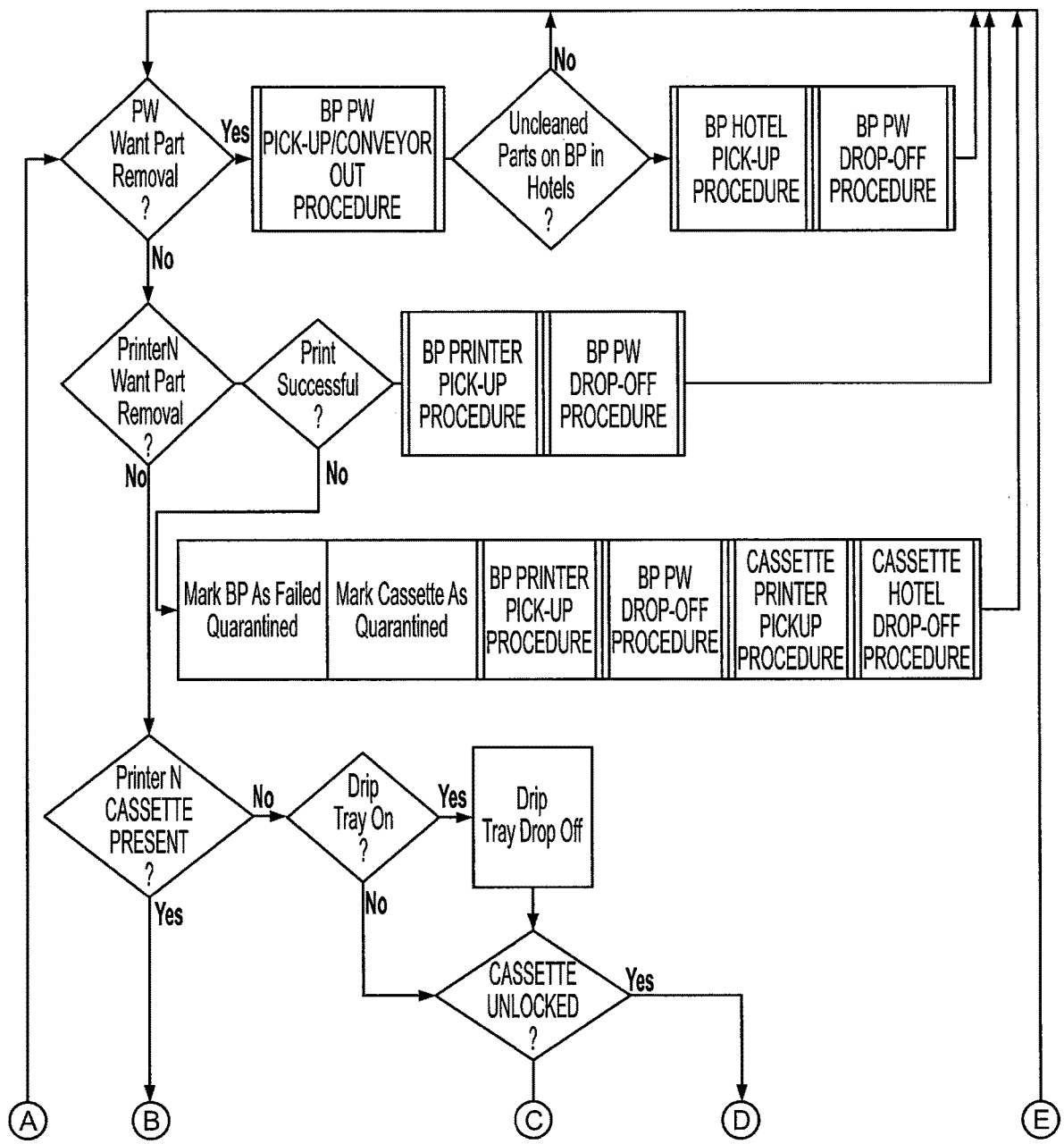
FIG. 17 is a flow chart illustrating an overall operating process of a system of FIGS. 2-4.
Figure 17:
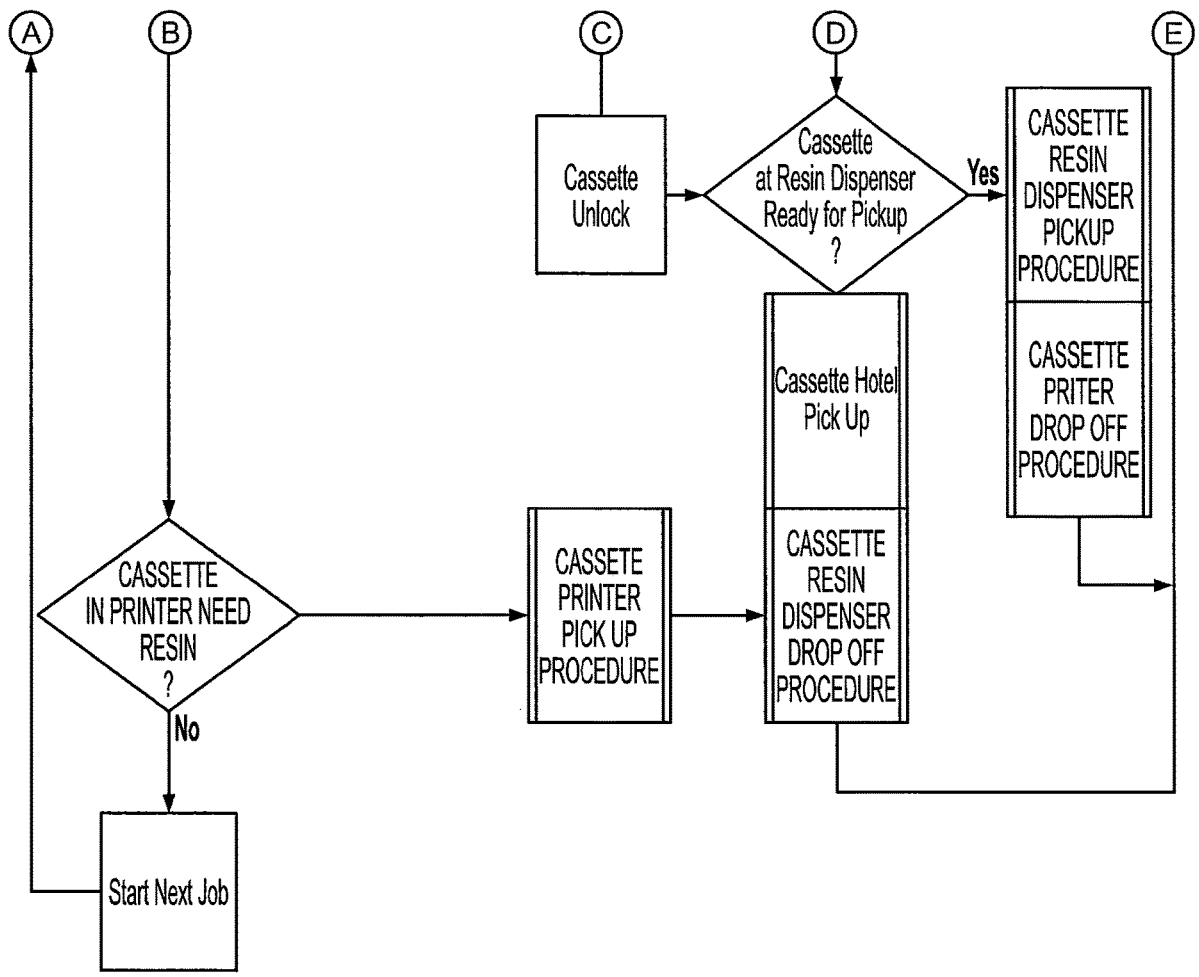
Figure 18:
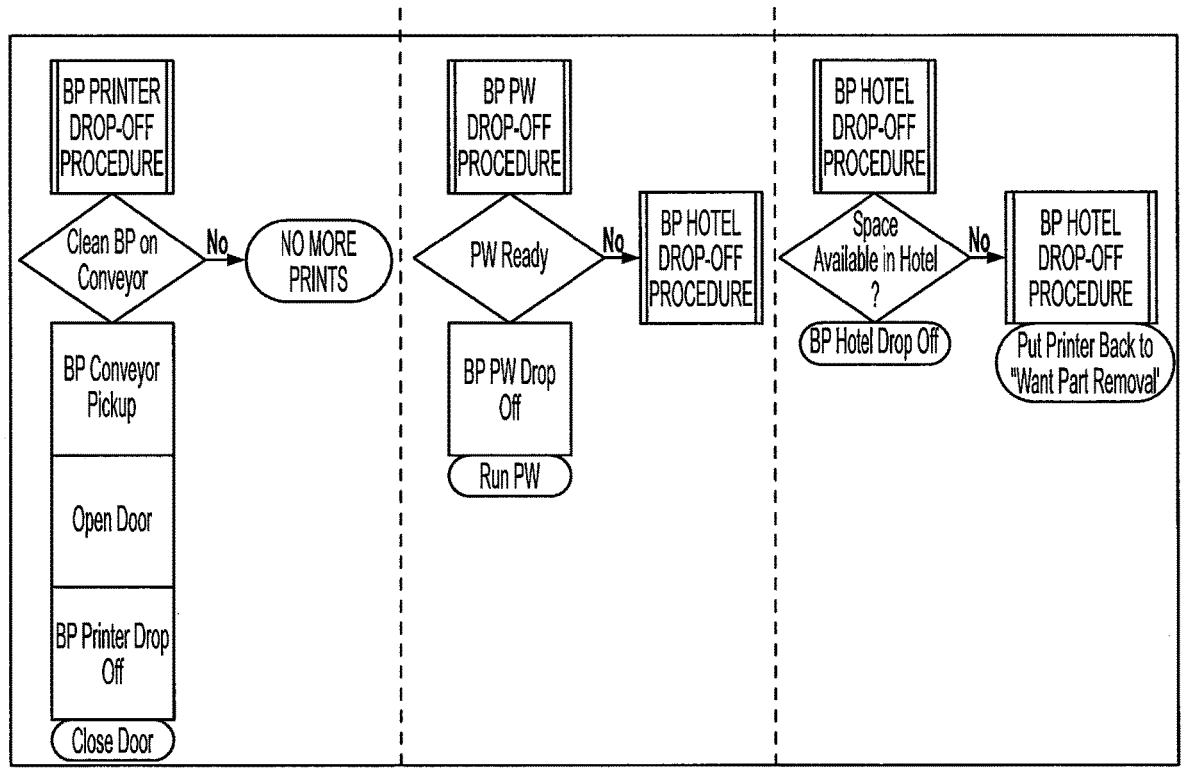
FIG. 18 is a flow chart illustrating details of build platform drop-off procedures for an operating process of FIG. 17.
Figure 19:
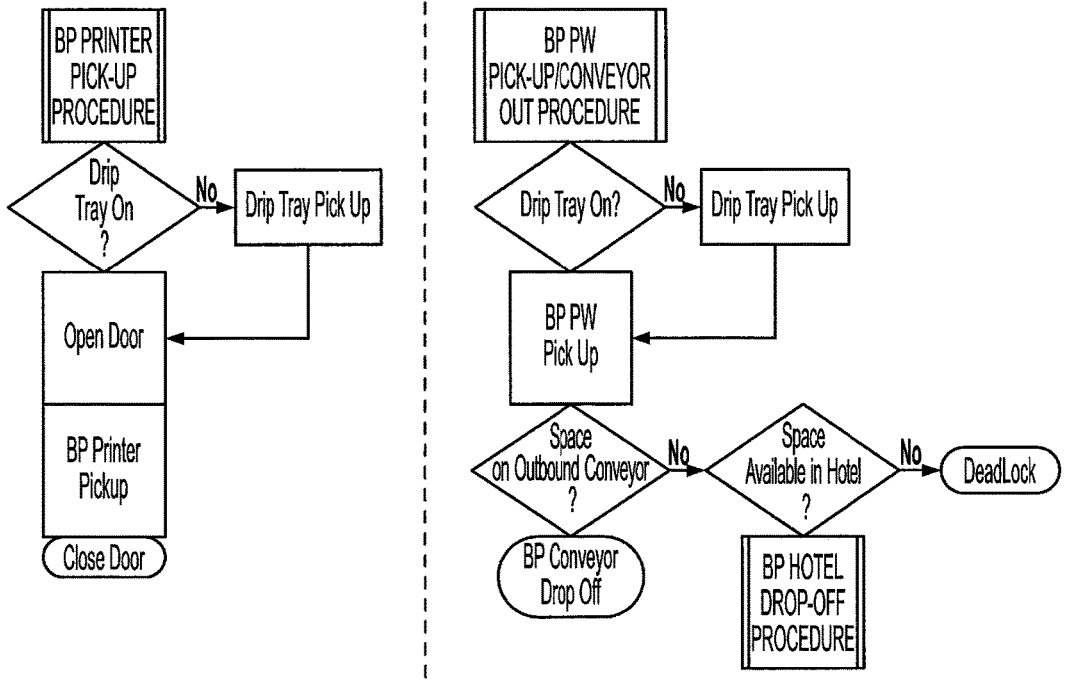
FIG. 19 is a flow chart illustrating details of build platform pick-up procedures for an operating process of FIG. 17.
Figure 20:
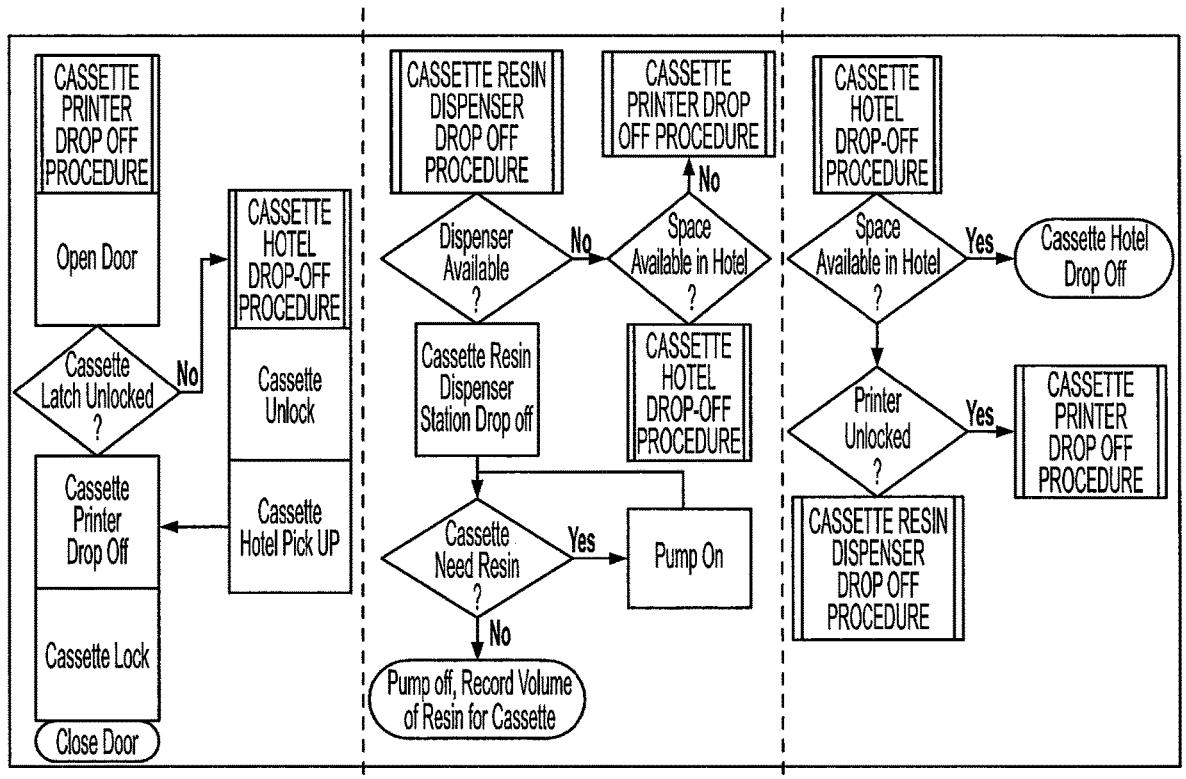
FIG. 20 is a flow chart illustrating details of window cassette drop off procedures for an operating process of FIG. 17.
Figure 21:
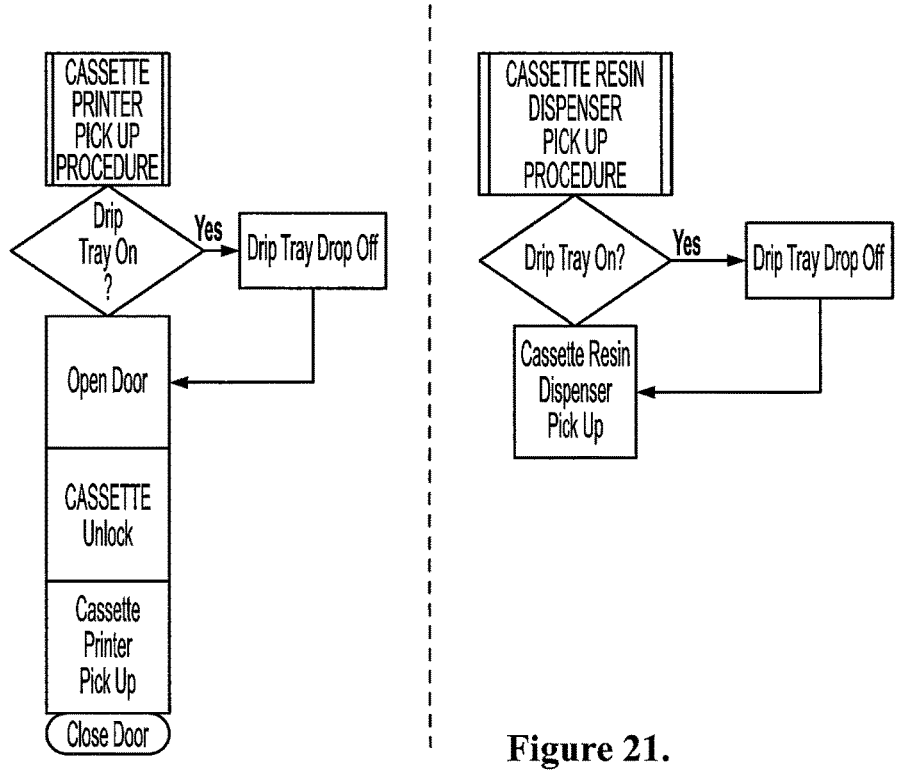
FIG. 21 is a flow chart illustrating details of window cassette pick-up procedures for an operating process of FIG. 17.

A non-limiting example of a window cassette (20) for carrying out the present invention is given in FIG. 15. The window cassette generally includes a light-transmissive window (401) and a frame (402), which frame provides a well above the window into which the light-polymerizable resin can be dispensed. The frame generally includes opposite handle portions (403) (the opposite side not being visible), which can be actively grasped by opposing jaws (111) of end effector 17, as shown in FIG. 16. Stations can be provided in the buffer (14) or in a separate location, where quarantined window cassettes can be placed after a failed print.

System Control.

As noted above, the system can include a controller configured to operate the system.

Controller (19 in FIG. 3) can be in any suitable form, such as a local general purpose computer operatively associated with the system components via a local area network (or metropolitan area network); a remote general purpose computer operatively associated with machines via a wide area network or internet connection; and combinations thereof (for example, organized in a client-server architecture and/or distributed architecture). Likewise, data storage and/or memory for the system and controller can be on separate (volatile and/or non-volatile) memory devices located locally or remotely, partitioned sections of a single memory device, etc., including combinations thereof (e.g., a remote back-up memory in addition to a local memory). Peripheral devices for data entry and display can be implemented in any of a variety of ways known in the art, including typical keypad entry, video display, and printing apparatus, as well as graphical user interfaces such as touch-pads, touch-screens and the like, including smart-phone touch screens.

In general, the controller is configured to operate the robot to:
(i) retrieve a build platform from said dispensing assembly,
(ii) insert said build platform into an available one of said at least two additive manufacturing apparatus for additive manufacturing of an object on said build platform
(iii) withdraw a build platform from an additive manufacturing apparatus when production of an object thereon is complete,
(iv) either insert a build platform carrying an object into the cleaning apparatus when the cleaning apparatus is available or insert the build platform into the buffering assembly when the cleaning apparatus is not available,
(v) withdraw a build platform from the cleaning apparatus when cleaning of the object thereon is complete,
(vi) insert a build platform carrying a cleaned object into said build platform receiving assembly,
(vi) withdraw a build platform from the buffering assembly and insert it into the cleaning apparatus when one or more build platforms have been removably inserted in said buffer assembly (e.g., on a first-in-first-out basis), and
(vii) repeat steps (i) and (ii) whenever both an additive manufacturing apparatus and a build platform are available for production of an object thereon (so that additive manufacturing is carried out concurrently on all of the machines of the system, although individual machines can optionally be deactivated and pulled "off line" if production failures from that particular apparatus are detected, in addition to or as an alternative to "quarantining" a window cassette as discussed above).

Additional details of the operation of the system and controller are given in the flow charts set forth in FIGS. 17-21, where "BP" means build platform, and "PW" means part washer or other cleaning apparatus.

The foregoing is illustrative of the present invention, and is not to be construed as limiting thereof. The invention is defined by the following claims, with equivalents of the claims to be included therein.

We claim:

1. An additive manufacturing system, comprising:
(a) a build platform dispensing assembly carrying a plurality of build platforms;
(b) at least two additive manufacturing apparatus, each apparatus configured for receiving one of the plurality of build platforms as a removable build platform on which objects can be produced;
(c) a build platform buffering assembly configured for removably receiving at least one build platform on which an object has been produced;
(d) a cleaning apparatus; and
(e) a robot operatively associated with each of said cleaning apparatus, said at least two additive manufacturing apparatus, said build platform dispensing assembly, and said build platform buffering assembly.

2. The system of claim 1, said robot further comprising an end effector, said end effector configured to actively or passively releasably engage said build platform.

3. The system of claim 2, further comprising:
(f) a drip tray;
and wherein said end effector is configured to actively or passively releasably engage said drip tray, with said drip tray positioned beneath said build platform when said build platform is also engaged by said end effector.

4. The system of claim 1, further comprising:
(f) a controller operatively associated with said robot, said cleaning apparatus, said at least two additive manufacturing apparatus, optionally said build platform dispensing assembly, and optionally said build platform buffering assembly.

5. The system of claim 4, said controller configured to operate said robot to:
(i) retrieve a build platform from said dispensing assembly,
(ii) insert said build platform into an available one of said at least two additive manufacturing apparatus for additive manufacturing of an object on said build platform,
(iii) withdraw a build platform from an additive manufacturing apparatus when production of an object thereon is complete,
(iv) either insert a build platform carrying an object into the cleaning apparatus when the cleaning apparatus is available or insert the build platform into the buffering assembly when the cleaning apparatus is not available,
(v) withdraw a build platform from the cleaning apparatus when cleaning of the object thereon is complete,
(vi) optionally insert a build platform carrying a cleaned object into a build platform receiving assembly that is configured to receive build platforms on which objects have been produced,
(vi) withdraw a build platform from the buffering assembly and insert it into the cleaning apparatus when one or more build platforms have been removably inserted in said buffering assembly, and
(vii) repeat steps (i) and (ii) whenever both an additive manufacturing apparatus and a build platform are available.

6. The system of claim 1, wherein said at least two additive manufacturing apparatus and said cleaning apparatus are included in a ratio of at least 2:1.

7. The system of claim 1, wherein said cleaning apparatus comprises a solvent washer or a centrifugal separator.

8. The system of claim 1, further comprising:
a rinse apparatus; and/or
a post-production flood light exposure apparatus.

9. The system of claim 4, wherein:
said dispensing assembly is further configured to receive build platforms on which objects have been produced; or
said system further comprises a receiving apparatus configured to receive build platforms on which objects have been produced, wherein said robot and/or said controller is optionally operatively associated with said receiving apparatus.

10. The system of claim 2, each of said additive manufacturing apparatus further comprising a removable window cassette through which patterned light can be projected and above which said objects can be produced;
and wherein said end effector is configured to actively or passively removably engage said window cassette.

11. The system of claim 1, wherein each said additive manufacturing apparatus comprise a stereolithography apparatus.

12. The system of claim 1, wherein said robot comprises an articulated robot, delta robot, cartesian coordinate robot, or SCARA robot.

* * * * *